Figure 1:
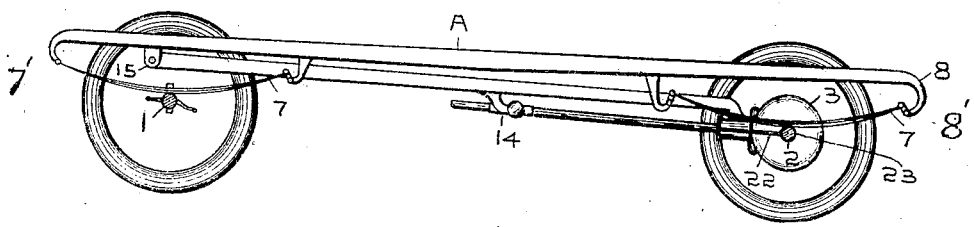

No. 813,541. PATENTED FEB. 27, 1906.
F. M. BLAIR.
AUTOMOBILE.
APPLICATION FILED JULY 15, 1905.

WITNESSES.
Chas. A. Boare
Grace Cowdrick

INVENTOR.
Frank M. Blair
BY Robt B Wilson
ATTORNEY.

UNITED STATES PATENT OFFICE.

FRANK M. BLAIR, OF TOLEDO, OHIO.

AUTOMOBILE.

No. 813,541.   Specification of Letters Patent.   Patented Feb. 27, 1906.

Application filed July 15, 1905. Serial No. 269,541.

*To all whom it may concern:*

Be it known that I, FRANK M. BLAIR, a citizen of the United States, and a resident of Toledo, in the county of Lucas and State of Ohio, have invented a new and useful Improvement in Self-Adjusting Supports for Motors and Driving-Shafts of Automobiles, of which the following is a specification.

My invention relates to a self-adjusting support for the motor and driving-shaft of automobiles, and has for its object to provide the main frame of an automobile with a subsidiary frame for supporting the motor and driving-shaft, whereby the driving-shaft is maintained in direct alinement with the motor-shaft and driving-gear whatever the variance of the wheels and other parts of the running-gear from their normal relation to each other in passing over inequalities in its path of travel or from variations of the load.

A further object is to provide a subsidiary frame for the purpose that is adapted to reduce the vibration of the rearward portion of the main frame produced by the motor, and thereby to reduce the vibration of the seat portion of the body of the vehicle.

I accomplish these objects by constructing and mounting a supporting-frame for the motor and driving-shaft of an automobile, substantially as hereinafter described, and illustrated in the drawings, in which—

Figure 2:
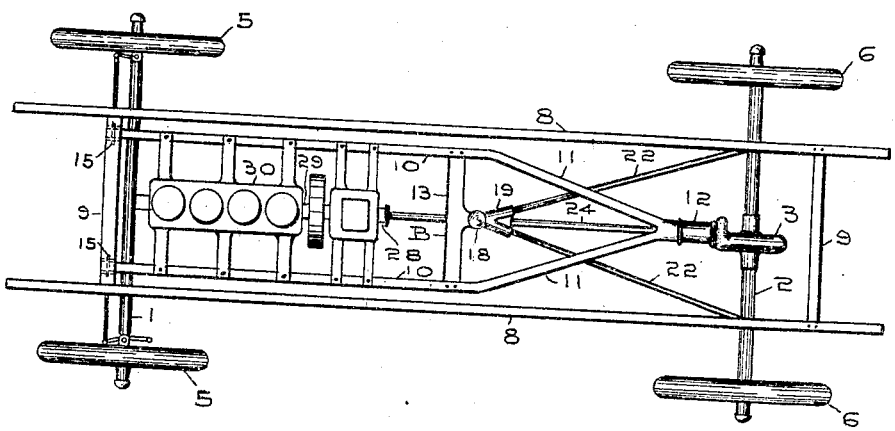
Figures 3, 4:
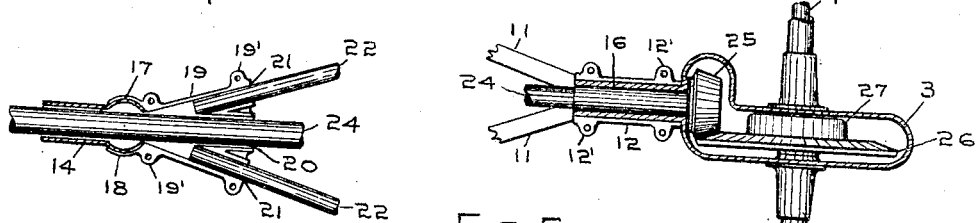
Figure 5:
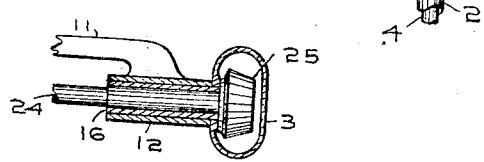

Figure 1 is a view in side elevation of an automobile running-gear equipped with my invention. Fig. 2 is a top plan view of the same, showing a motor supported thereon. Fig. 3 is a horizontal section, enlarged, of ball-and-socket joint of the radius-rods and showing broken-away portions of parts connected thereto. Fig. 4 is a similar section of the swivel-bearing of the gear-case, motor-supporting frame, and shaft, showing broken-away portions of parts connected thereto; and Fig. 5 is a vertical section of the same.

In the drawings, A represents a running-gear comprising the front axle 1, provided with knuckle-jointed wheel-journals; the tubular rear axle 2, provided with a gear-case 3, and the inner axles 4; the wheels 5, journaled on the front axle; the wheels 6, fixed on the inner rear axles; the springs 7, mounted on the front and rear axles, and the main frame, comprising the side bars 8, mounted on the springs, and the front and rear cross-bars 9. The springs 7 are preferably half-elliptic, and the front ends of the springs are hinged to the under sides of the bars 8 by the hinges 7', and their rear ends are linked to the under side of the bars by the short links 8', as shown in Fig. 1.

B represents the subsidiary frame for supporting the motor and driving-shaft and comprises the side bars 10, having their main body portions extended parallel with and between the side bars 8 of the main frame and having their rear end portions 11 converged V shape and united and provided at the apex with a swivel-bearing 12, and a cross-bar 13, cross-connecting the bars 10 near the angles of the converged portions 11, the bar 13 being provided with a depending sleeve 14 in alinement with the bearing 12. The swivel-bearing 12 is preferably split in the horizontal plane of its axis, as shown in Fig. 4, and the complementary sections are provided with lugs 12', perforated to receive the bolts by which the sections are secured together.

The front end portions of the bars 10 are suitably pivoted to the pending lugs 15 of the front cross-bar 9 of the main frame, and the frame B thus constructed is of a length to extend from the lugs 15 to the body of the gear-case 3, which is provided with a tubular journal 16, which extends in line with and into the swivel-bearing 12. The bore of the journal 16 intersects the chamber of the gear-case and adapts the journal to serve also as a bearing for the driving-shaft.

The sleeve 14 is preferably provided at its rearward end with an enlarged hollow spherical extension 17, forming the ball member of a ball-and-socket joint, of which the complementary socket member 18 is formed as an extension from a triangular tubular head 19, having a central bore 20 in line with the sleeve 14 and side bores 21 diverting at equal angles from the bore 20.

The head 19 is preferably formed of half-sections, each half-section having complementary ears 19' coinciding with the divisional plane of the head, the ears being perforated to receive the bolts or rivets by which the sections are secured together, with the ball extension 17 within the socket 18 of the head. The side bores 21 have suitably secured therein the front end portions of the radius-rods 22, which diverge rearward therefrom and have their rearward end portions suitably secured by clips 23 to the rear axle.

In the bearing-journal 16 is journaled the rear end portion of the driving-shaft 24, which extends beyond the bearing into the gear-case 3 and has mounted thereon within the case the beveled pinion 25, which intermeshes with the main driving beveled gear-wheel 26, operating the differential gear mechanism 27, by which the inner axles 4 are revolved. From the bearing 16 the driving-shaft 24 extends in direct line through the bore 20 of the head 19, the ball-and-socket joint 18, and the sleeve 14 to the transmission-shaft 28, to which it is suitably coupled in line with the crank-shaft 29 of the motor 30, which is suitably mounted and supported on the side bars 10 of the frame B.

The motor and driving-shaft being thus mounted and alined on the frame B with the bearing 16, it is apparent that the frame B is adapted by its hinge-bearings 15 and its swivel-bearing 12 to adjust itself to any independent up and down movements of parts of the running-gear without distorting or disturbing the alinement of the bearings of the driving-shaft 24, it being manifest, for example, that if either one of the rear wheels is raised above or drops below the level of the other the swivel-bearing 12 and the hinges 15 permit such movement without creating any strain of the shaft on its bearings or between its pinion and the driving-gear, while the ball-and-socket joint 18 permits the required adjustment of the radius-rods to the tilted position of the rear axle without affecting their capacity for truss bracing and holding the rear axle at right angles to the shaft and in position to maintain a direct alinement of the journal 16 with the swivel 12 and the shaft 24, the only effect of such tilting of the rear axle on the frame B being to raise or lower its swivel end proportionately less than the distance the wheel is raised or lowered. As the rear axle is raised or lowered by a wheel the journal 16 of the gear-case turns in the swivel-bearing 12 and on the shaft 24. It will be seen also that the raising or lowering of either of the front wheels (in so far as such movement is not taken up by the springs) produces a proportionately less raising or lowering of the front end of the frame B to the raising or lowering of the front end of the frame A and that by reason of the action of hinges 15, the ball-and-socket joint 18, and the swivel 12 such raising or lowering does not in any wise tend to create any strain between the shaft and its bearings, and the same is true also if one front wheel and the diagonally opposite rear wheel be raised or lowered at the same time or if one be raised and the other lowered, the swivel-bearing 12 and the journal-bearing 16 being adapted to permit of their independent simultaneous rotation in opposite or in the same direction, according as the independent movements of the parts to which they are respectively attached may require, and without interfering with the rotation of the shaft independently of both.

The frame B being hinged to the front cross-bar 9 of the frame A at the front end and connected to the rear axle by the radius-rods 22 and the swivel 12 at the rear end in such manner as to prevent any increase or diminution of the normal distance between the two parts of the running-gear, it is manifest that the distance between the motor and the gear-case will remain constant and that there will be no lengthwise pull or thrust on the driving-shaft arising either from depression of the springs or the raising of the axles, and that by the use of my invention no provision is required for the telescopic lengthening or shortening of the driving-shaft in order to avoid such pull or thrust on the shaft, as by my construction the elasticity of the springs and the links 8' readily permits the slight changes in the wheel-base necessary to accommodate the up and the down movement of the axles or of the main frame A through the short arcs described by the ends of the frame B during such up and down movement. It will be seen also that by connecting and supporting the frame B as shown and described the vibration produced by the motor is divided between the front cross-bar 9 of the main frame and the rear axle and that by reason thereof the degree of vibration transmitted to the seat portion of the body of the vehicle is greatly reduced.

While a ball-and-socket joint is preferably used for connecting the radius-rods to the frame B, it is apparent that a swivel-joint may be substituted therefor without departing from the principle of adjustably supporting the frame shown and described, and I therefore do not limit myself to the use of the ball-and-socket joint for such purposes. It is apparent also that by a change of diameters only the relative positions of the swivel 12 and shaft-bearing journal 16 in the formation of the pivotal connection between the frame B and the gear-case 3 may be exchanged without affecting the pivotal capacity of either and that either arrangement of the connection may be used in its construction. I therefore do not limit myself to the arrangement of the connection as shown.

What I claim to be new is—

1. In an automobile, the combination with a running-gear comprising a rear axle having a casing provided with a bearing extending forward radial to the casing, and with rotatable axles, a front axle parallel with the rear axle, a pair of springs fixedly mounted transverse each axle, and a main body-supporting frame having side bars directly mounted and supported on the springs, of a subsidiary frame having its front end portion hinged at a plurality of points to the front end portion of the main body-supporting frame between the side bars, and its rear end extended to the rear axle and rotatably mounted on the radial bearing, a motor mounted on the subsidiary frame, a shaft connected to the motor and extending in direct line from the connection through the radial bearing of the rear axle, means connected to the shaft and the inner axles adapting the shaft to rotate the axles, a sleeve mounted concentric to the shaft between the motor and the radial bearing, and fixedly supported by the subsidiary frame, a radius-head rotatably mounted on the sleeve concentric to the shaft, and radius-rods diverging from the radius-head and secured to the rear axle.

2. The combination in an automobile running-gear, of a tubular rear axle having a central gear-case provided with a tubular bearing extending forward radial to the axle, said axle being also provided with inner axles that are gear-connected within the gear-case, a front axle parallel with the rear axle, a pair of half-elliptic springs, mounted transverse each axle, a main body-supporting frame hinged and linked to and supported on the ends of the springs of the axle, as set forth, a subsidiary motor-supporting frame, having its front end portion hinged to the front end portion of the main body-supporting frame on each side of a line parallel with and central between the side bars of the main frame, and its rear ends centrally and pivotally supported by the tubular bearing of the gear-case, a motor mounted on the subsidiary frame, a differential gear mechanism mounted on the frame adapted to be operated by the motor, a sleeve secured to and supported by the motor-supporting frame in line with and between the tubular bearing of the gear-case and the differential gear mechanism, a tubular radius-head rotatably mounted on the sleeve, radius-rods diverging at equal angles from the radius-head, and secured to the rear axle, a driving-shaft adapted to be revolved by the differential gear mechanism of the motor, and extending in direct line with and through the journal-sleeve, radius-head, and the bearing of the gear-case, and a gear on the shaft within the gear-case connected with and adapted to operate the gear of the inner axles substantially as set forth.

In witness whereof I have hereunto signed my name, in the presence of two subscribing witnesses, this 12th day of July, 1905.

FRANK M. BLAIR.

Witnesses:
ROBERT MACKAY,
WALTER A. EVERMAN.